United States Patent [19]
Altshuler

[11] Patent Number: 5,820,133
[45] Date of Patent: Oct. 13, 1998

[54] ROTARY CONTROL VALVE AND SEAL MECHANISM

[75] Inventor: Edward L. Altshuler, Waukesha, Wis.

[73] Assignee: Fleck Controls, Inc., Brookfield, Wis.

[21] Appl. No.: 768,752

[22] Filed: Dec. 17, 1996

Related U.S. Application Data

[60] Provisional application No. 60/013,960 Mar. 15, 1996.
[51] Int. Cl.⁶ ...................................................... F16J 15/32
[52] U.S. Cl. ........................... 277/630; 277/637; 277/644; 277/649
[58] Field of Search .................................... 251/314, 363; 277/630, 637, 644, 649

[56] References Cited

U.S. PATENT DOCUMENTS

| | | | |
|---|---|---|---|
| 2,332,882 | 10/1943 | Abbatiello . | |
| 2,481,460 | 9/1949 | Williams | 251/363 |
| 2,746,777 | 5/1956 | Korn . | |
| 2,938,704 | 5/1960 | Quail | 251/363 |
| 2,996,083 | 8/1961 | Huska | 137/625.11 |
| 3,090,396 | 5/1963 | Rudelick | 137/375 |
| 3,165,122 | 1/1965 | Sachnik | 137/625.47 |
| 3,451,430 | 6/1969 | Cowdin | 251/363 |
| 3,840,048 | 10/1974 | Moen | 251/363 |
| 3,874,413 | 4/1975 | Valdez | 137/625.47 |
| 3,955,859 | 5/1976 | Stella et al. . | |
| 4,345,622 | 8/1982 | Henningsson | 137/637.1 |
| 4,371,178 | 2/1983 | Ott | 251/363 |
| 4,478,388 | 10/1984 | George | 251/314 |
| 4,491,155 | 1/1985 | Meyer et al. | 251/363 |
| 4,494,730 | 1/1985 | George | 251/314 |
| 4,501,295 | 2/1985 | Williams et al. | 137/625.19 |
| 4,865,170 | 9/1989 | Ciepichal . | |
| 4,986,307 | 1/1991 | Hardee | 137/625.19 |

*Primary Examiner*—Randolph A. Reese
*Assistant Examiner*—John L. Beres
*Attorney, Agent, or Firm*—Lee, Mann, Smith, McWilliams, Sweeney & Ohlson

[57] ABSTRACT

A seal mechanism for a rotary control valve having a housing with a plurality of ports and a generally cylindrical rotor having an external surface and a plurality of ports rotatably located within the housing. The seal mechanism is located between the external surface of the rotor and the housing and includes a generally cylindrical collar which extends substantially around the circumference of the rotor. The collar includes one or more ports adapted to respectively align with the ports in the rotor and in the housing and a groove extending around each collar port. A seal member having an aperture, an outwardly extending first flange and an inwardly extending second flange is located within the groove of the collar. The first flange has a first sealing face adapted to sealingly engage the housing and the second flange includes a second sealing face adapted to sealingly engage the external surface of the rotor. The seal member is adapted to provide a sealed fluid passage through the aperture of the seal member between a port of the rotor and a port of the housing. A retainer member is associated with the seal member and includes an outer rim having an outer peripheral edge and an inner rim having an outer peripheral edge. The first flange of the seal member extends around the outer edge of the outer rim and the second flange of the seal member extends around the outer edge of the inner rim.

20 Claims, 7 Drawing Sheets

ROTARY CONTROL VALVE AND SEAL MECHANISM

RELATED APPLICATIONS

This application claims the benefit of U.S. Provisional application Ser. No. 60/013,960, filed Mar. 15, 1996.

BACKGROUND OF THE INVENTION

The present invention is directed to a rotary control valve which may be used in connection with a water conditioning system, and in particular to a control valve having a rotor located within a housing and a seal mechanism for creating a seal between ports of the housing and ports of the rotor.

DETAILED DESCRIPTION OF THE PREFERRED EMBODIMENT

Figure 1:
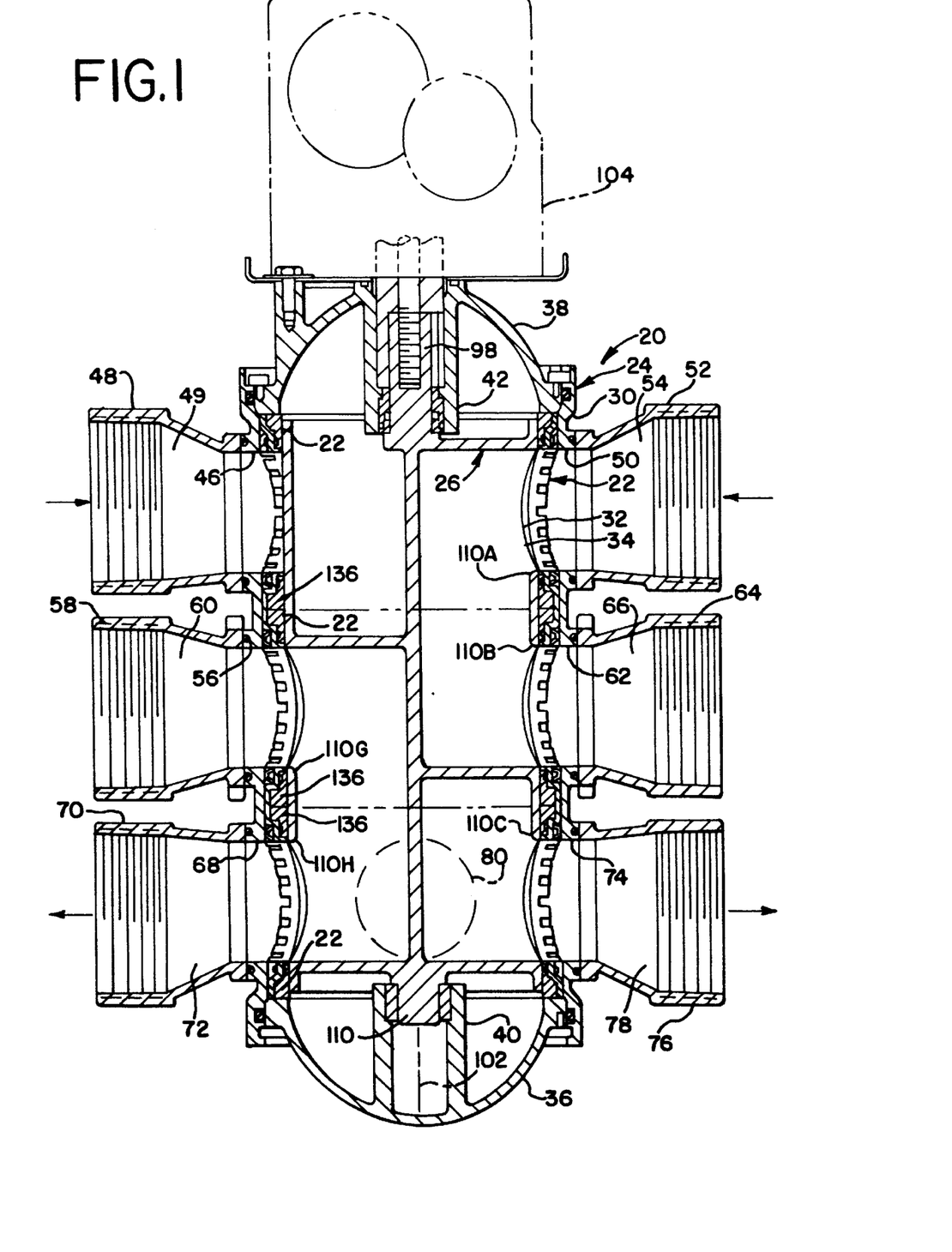
FIG. 1 is a cross-sectional view of one embodiment of the rotary control valve and seal mechanism of the present invention.

A preferred embodiment of the rotary control valve 20 and of the seal mechanism 22 of the present invention is shown in FIG. 1. The control valve 20 is adapted for use in controlling the operation of a liquid conditioning system, such as a water filtration system. The control valve 20, as shown in FIG. 1, includes a housing 24, a rotor 26 and one or more seal mechanisms 22.

The housing 24 includes a central body member 30 having a side wall 32 which forms a generally cylindrical chamber 34 within the housing 24. The housing 24 also includes a first end cap 36 which is removably attached to a first end of the central body member 30 and a second end cap 38 which is removably attached to the second and opposite end of the central body member 30. The end caps 36 and 38 enclose the ends of the chamber 34 in the housing 24. The first end cap 36 includes a bearing member 40 and the second end cap 38 includes a bearing member 42 and a passageway which extends through the second end cap 38.

Figure 2:
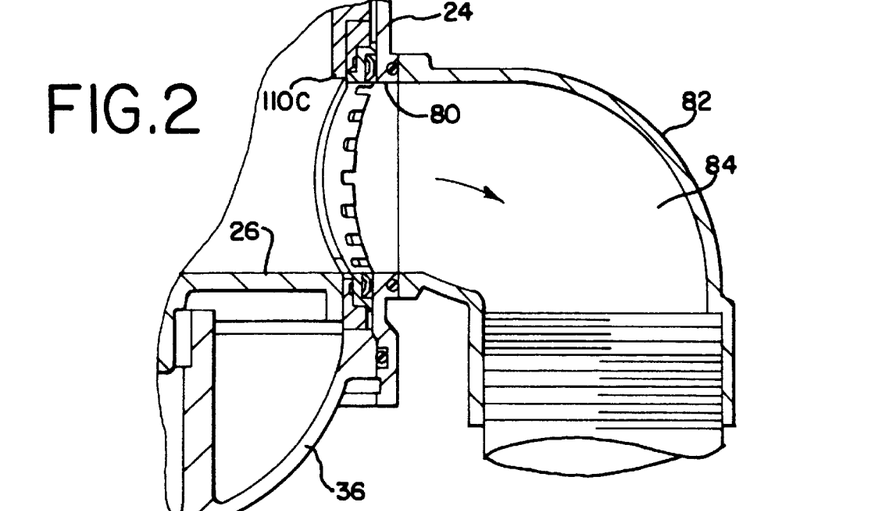
FIG. 2 is a partial cross-sectional view of the rotary control valve.

The side wall 32 of the housing 24 includes an inlet a first port 46 in fluid communication with the chamber 34 which is adapted to be placed in fluid communication with a first fluid conduit 48 having a fluid passage 49. The first fluid conduit 48 is connected to an external plumbing system which provides a supply of raw or untreated liquid. The side wall 32 includes a second port 50 in fluid communication with the chamber 34 which is located diametrically across the chamber 34 from the first port 46. The second port 50 is adapted to be placed in fluid communication with a second fluid conduit 52 having a fluid passage 54 which contains treated liquid. A third port 56 is located in the side wall 32 in fluid communication with the chamber 34. The third port 56 is adapted to be connected in fluid communication with a third fluid conduit 58 having a third fluid passage 60 which provides fluid communication with a first port of a mineral tank (not shown), which is preferably in fluid communication with the top of the mineral tank A fourth port 62 is located in the side wall 32 of the housing 24 in fluid communication with the chamber 34. The fourth port 62 is adapted to be connected in fluid communication with a fourth fluid conduit 64 having a fourth fluid passage 66. The fourth fluid passage 66 is adapted to be connected to a second port of the mineral tank, which is preferably in fluid communication with the bottom of the mineral tank. The fourth port 62 is located diametrically across the chamber 34 from the third port 56. The side wall 32 of the housing 24 includes a fifth port 68 which is in fluid communication with the chamber 34. The fifth port 68 is adapted to be connected in fluid communication with a fifth fluid conduit 70 having a fifth fluid passage 72. The fifth fluid passage 72 is adapted to provide fluid communication with a backwash drain. The side wall 32 of the housing 24 includes a sixth port 74 which is in fluid communication with the chamber 34. The sixth port 74 is adapted to be placed in fluid communication with a sixth fluid conduit 76 having a sixth fluid passage 78. The sixth fluid passage 78 is adapted to provide a supply of treated liquid. The sixth port 74 is located diametrically across the chamber 34 from the fifth port 68. The side wall 32 of the housing 24 also includes a seventh port 80, as best shown in FIG. 2, which is in fluid communication with the chamber 34. The seventh port 80 is adapted to be placed in fluid communication with a seventh fluid conduit 82 having a seventh fluid passage 84. The seventh fluid passage 84 is adapted to provide fluid communication with a rapid rinse drain. The seventh port 80 is disposed in the side wall 32 at an approximate angle of 90° to the ports 68 and 74. The ports 46, 56 and 68 are aligned with one another in a generally longitudinal direction. The ports 50, 62 and 74 are also aligned with one another in a generally longitudinal direction.

Figure 15:
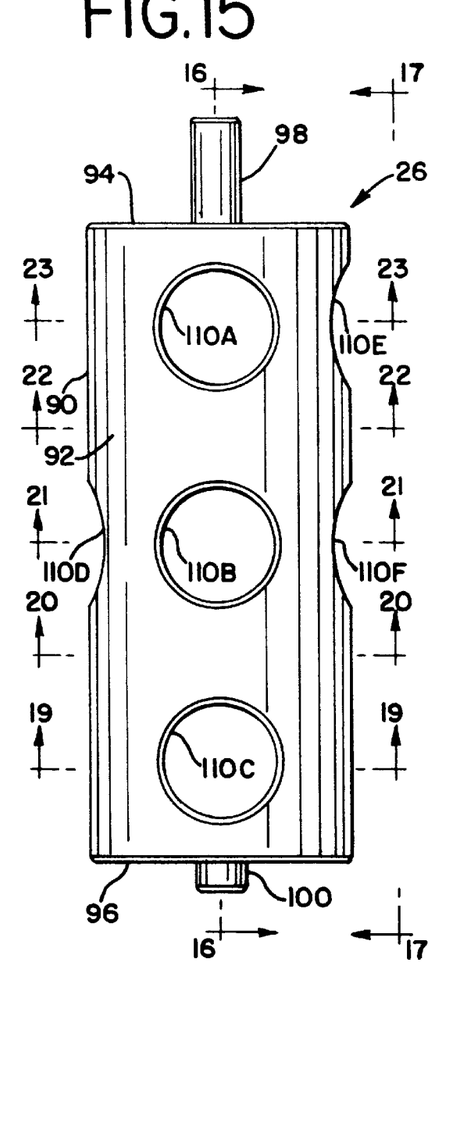
FIG. 15 is a front elevational view of the rotor of the control valve.

As shown in FIG. 15, the rotor 26 includes a generally tubular and cylindrical side wall 90 having an external cylindrical surface 92. The side wall 90 extends between a first end 94 and a second end 96. The rotor 26 includes a cylindrical shaft 98 which is adapted to be rotatably located within the bearing member 42 of the housing 24 and a cylindrical shaft 100 which is adapted to be rotatably located within the bearing member 40 of the housing 24. The rotor 26 includes a central axis 102 which extends concentrically within the side wall 90 and through the shafts 98 and 100. The rotor 26 is selectively rotatable about the axis 102 in either a clockwise or a counter-clockwise direction. As shown in FIG. 1, the shaft 98 of the rotor 26 is adapted to be connected to a control mechanism 104 which controls the selective rotation of the rotor 26 to any of a plurality of rotational positions as desired.

Figure 17:
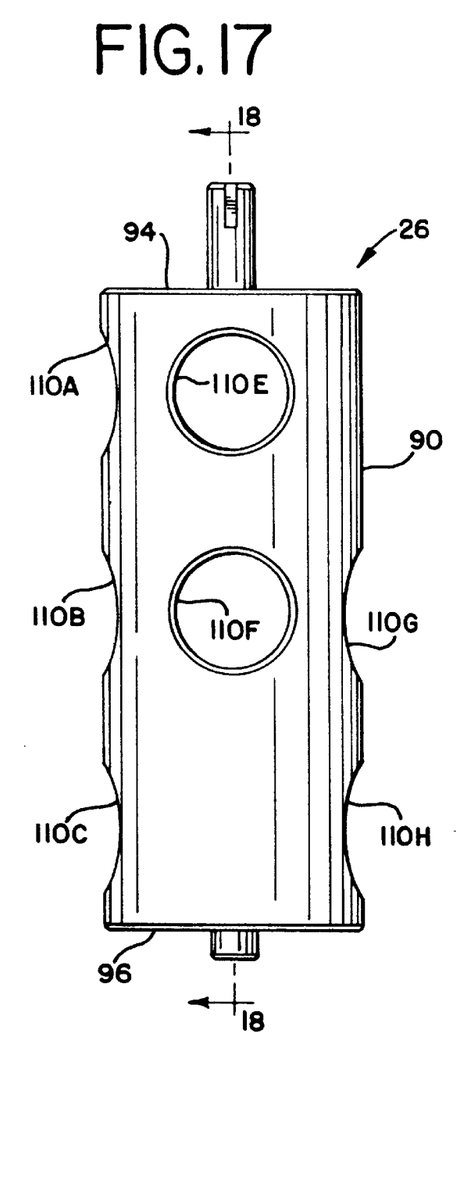
FIG. 17 is a side elevational view of the rotor taken along lines 17—17 of FIG. 15.

As shown in FIG. 15, the side wall 90 of the rotor 26 includes a port 110A, a port 110B, and a port 110C. The ports 110A–C are aligned in a longitudinal direction generally parallel to the axis 102. As shown in FIG. 15, the port 110A is located in an upper portion of the rotor 26, the port 110B is located in a central portion of the rotor 26, and the port 110C is located in a lower portion of the rotor 26. The side wall 90 of the rotor 26 includes a port 110D which is disposed at an approximately 90° angle to the port 110B about the axis 102. The port 110D is located in the center portion of the rotor 26 approximately midway between the first and second ends 94 and 96 of the side wall 90. As best shown in FIG. 17, the side wall 90 of the rotor 26 includes a port 110E and a port 110F. The port 110E is located in the upper portion of the rotor 26 and the port 110F is located in the center portion of the rotor 26. The ports 110E and 110F are longitudinally aligned with one another in a direction generally parallel to the axis 102 and are respectively disposed at an approximately 90° angle to the ports 110A and 110B about the axis 102. The side wall 90 of the rotor 26 also includes a port 110G and a port 110H. The port 110G is located in the center portion of the rotor 26 and the port 110H is located in the lower portion of the rotor 26. The ports 110G and 110H are longitudinally aligned with one another in a direction generally parallel to the axis 102 and are respectively located diametrically across the chamber 34 from the ports 110B and 110C.

Figure 16:
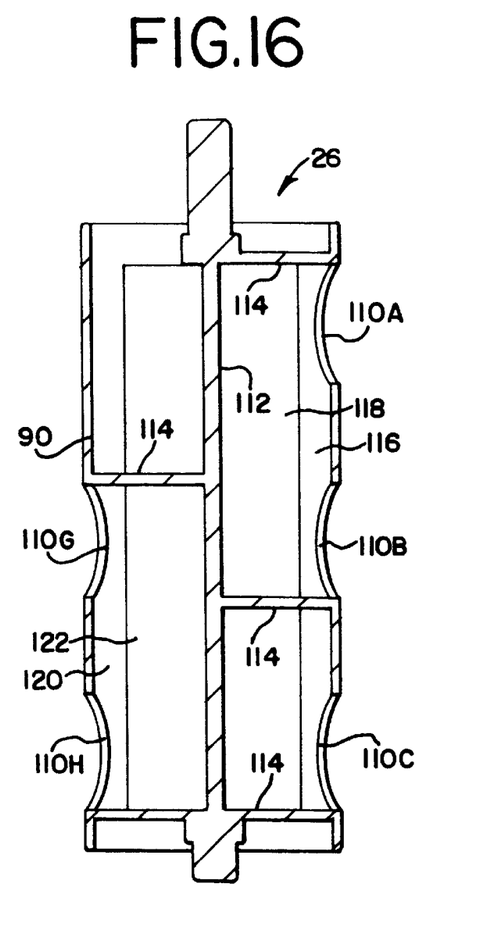
FIG. 16 is a cross-sectional view of the rotor taken along lines 16—16 of FIG. 15.
Figure 18:
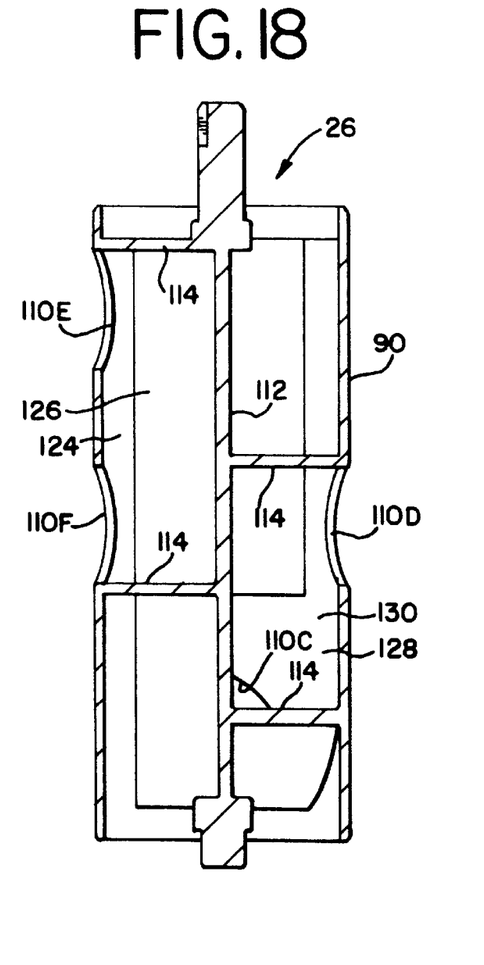
FIG. 18 is a cross-sectional view of the rotor taken along lines 18—18 of FIG. 17.
Figure 19:
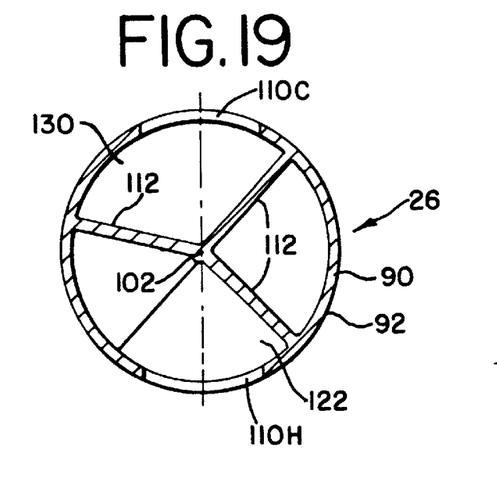
FIG. 19 is a cross-sectional view of the rotor taken along lines 19—19 of FIG. 15.
Figure 20:
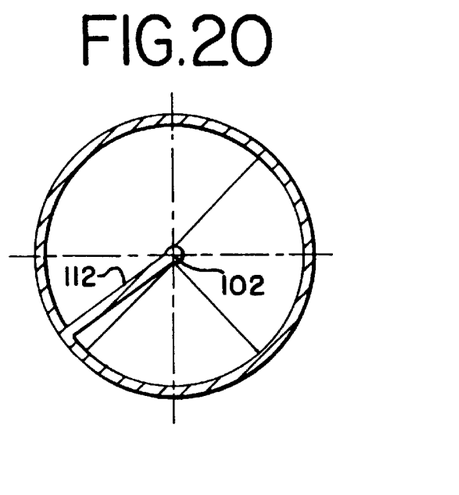
FIG. 20 is a cross-sectional view of the rotor taken along lines 20—20 of FIG. 15.
Figure 21:
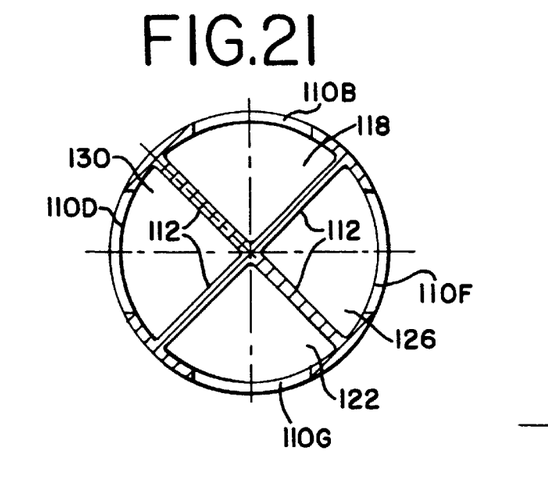
FIG. 21 is a cross-sectional view of the rotor taken along lines 21—21 of FIG. 15.
Figure 22:
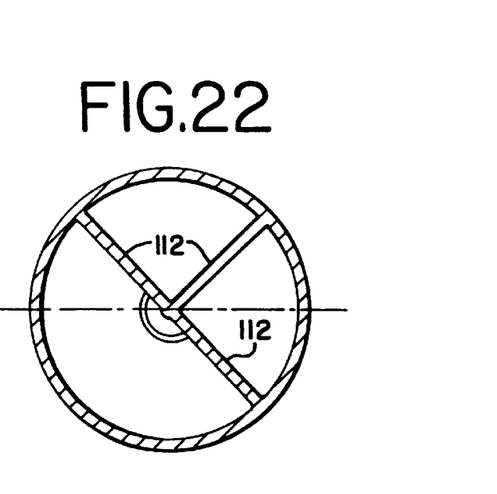
FIG. 22 is a cross-sectional view of the rotor taken along lines 22—22 of FIG. 15.
Figure 23:
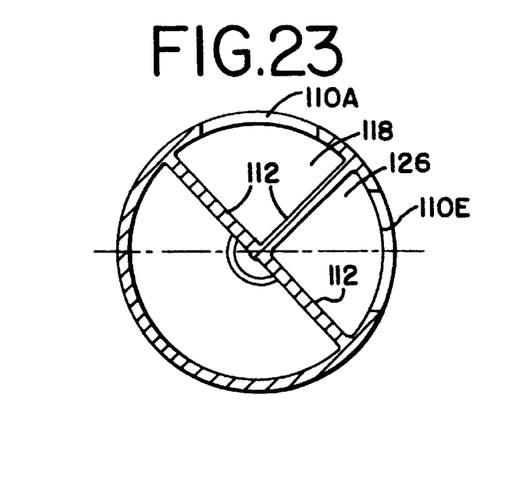
FIG. 23 is a cross-sectional view of the rotor taken along lines 23—23 of FIG. 15.

As best shown in FIGS. 19–23, the rotor 26 includes a plurality of longitudinal walls 112 which extend generally radially from the central axis 102 to the side wall 90. The rotor 26 also includes a plurality of transverse walls 114 which extend between selected longitudinal walls 112 and the side wall 90. The walls 112 and 114 form a plurality of chambers within the rotor 26. As best shown in FIG. 16, the rotor 26 includes a chamber 116 which forms a fluid passage 118 through the rotor 26 between the ports 110A and 110B. The rotor 26 also includes a chamber 120 which forms a fluid passage 122 between the ports 110G and 110H. As best shown in FIG. 18, the rotor 26 includes a chamber 124 which forms a fluid passage 126 between the ports 110E and 110F. The rotor 26 also includes a chamber 128 which forms a fluid passage 130 between the ports 110D and 110C.

Figures 12, 13, 14:
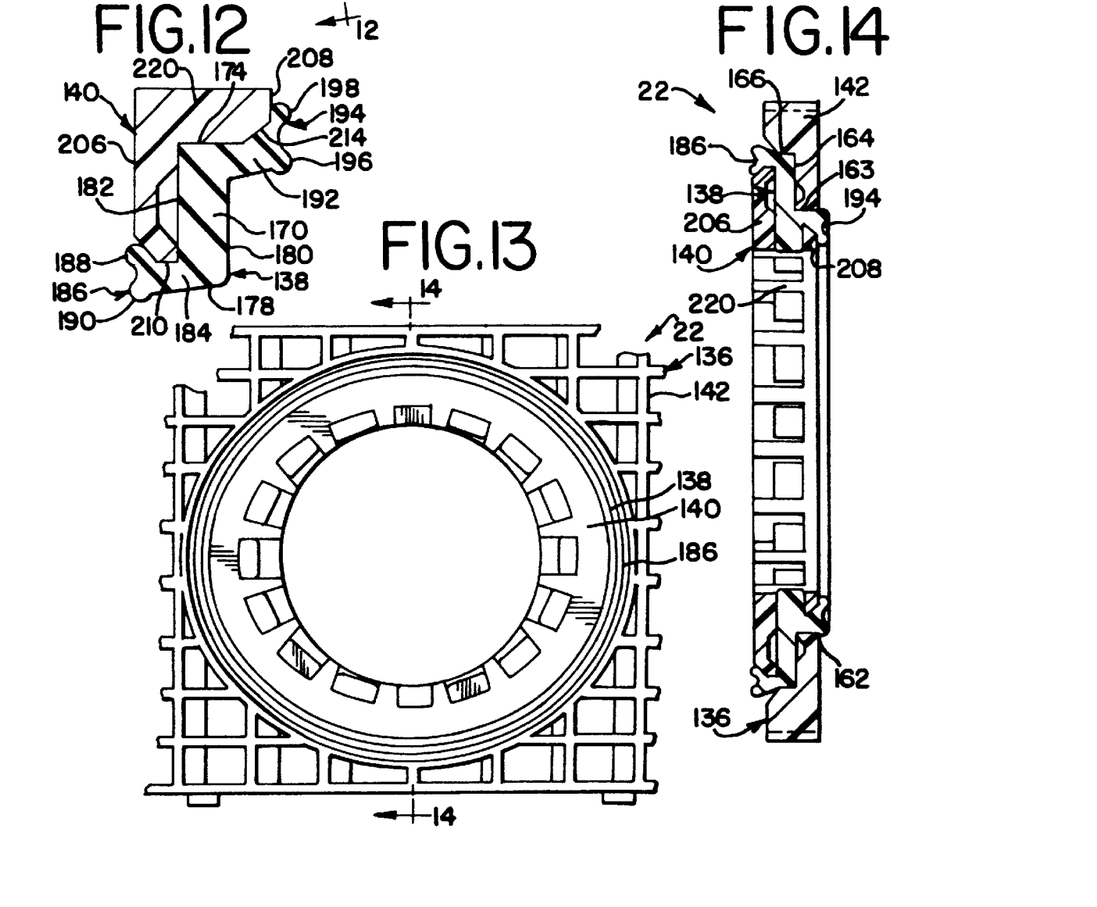
FIG. 12 is a cross-sectional view of the seal and retainer assembly taken along lines 12—12 of FIG. 10.
FIG. 13 is partial side elevational view of the seal mechanism showing the seal and retainer assembly in engagement with the cage.
FIG. 14 is a cross-sectional view taken along lines 14—14 of FIG. 13.

As best shown in FIGS. 13 and 14, the seal mechanism 22 includes a seal cage 136, a seal member 138 and a seal retainer 140. As best shown in FIGS. 6–9, the seal cage 136 includes a generally cylindrical collar 142 and a spacer member 144. The collar 142 includes an upper generally circular rim 146 and a spaced apart and parallel lower generally circular rim 148. The collar 142 extends in a generally circular manner from a first end 150 to a spaced apart second end 152. The ends 150 and 152 are each generally linear and extend at an angle relative to one another such that a generally V-shaped gap is formed between the ends 150 and 152. Each end 150 and 152 of the collar 142 includes an elongate channel 154. The spacer member 144 is a generally V-shaped wedge. The spacer member 144 includes a flange 156 on each side thereof which is adapted to be slidably inserted within a respective channel 154. The collar 142 is formed from a plastic material and includes a plurality of longitudinal and transverse ribs. The collar 142 is sized to fit closely within the chamber 34 along the side wall 32 of the housing 24. The spacer member 144 is inserted between the ends 150 and 152 of the collar 142 and wedges the seal mechanism 22 into engagement with the side wall 32 as the spacer member 144 is slid downwardly between the ends 150 and 152.

Figures 6, 7, 8, 9:
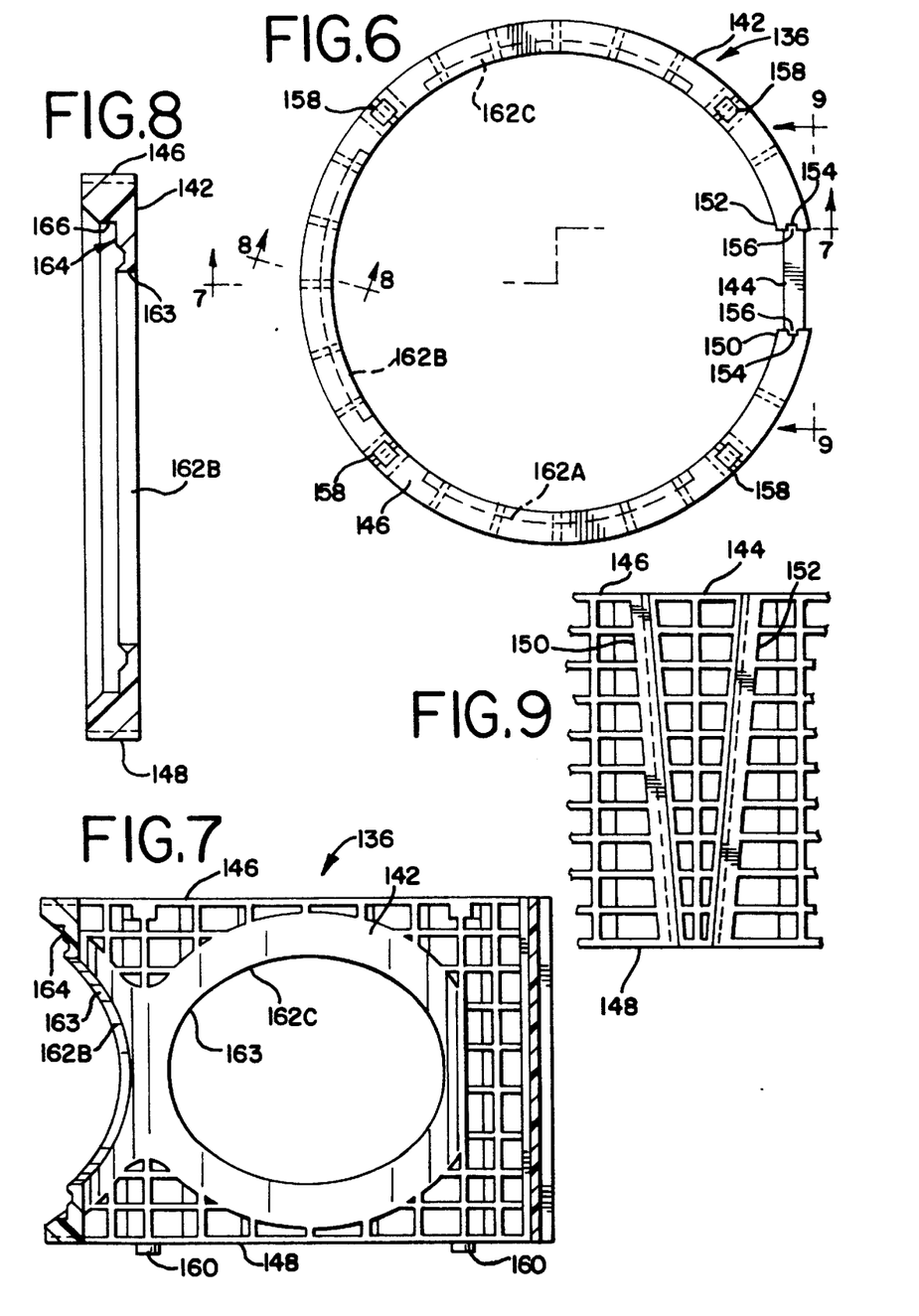
FIG. 6 is a top plan view of the cage of the seal mechanism.
FIG. 7 is a cross-sectional view of the cage taken along lines 7—7 of FIG. 6.
FIG. 8 is a cross-sectional view of the cage taken along lines 8—8 of FIG. 6.
FIG. 9 is a partial side elevational view of the cage taken along lines 9—9 of FIG. 6.

The upper rim 146 of the collar 142 includes a plurality of pockets 158 and the lower rim 148 includes a plurality of pegs 160. One or more seal cages 136 are adapted to be stacked one on top of the other such that the pegs in an upper seal cage fit within the pockets of the lower and adjacent seal cage. As shown in FIG. 1, the control valve 20 includes three seal cages 136 stacked one on top of the other. The seal cage 136 as shown in FIGS. 6 and 7 includes three ports 162A–C. Each port 162A–C includes a rim 163. As best shown in FIG. 8, a groove 164 having a wall 166 extends around the circumference of each port 162A–C. The groove 164 is located in the external surface of the collar 142.

A first seal cage 136 is adapted to be positioned as the bottom seal cage within the chamber 34, as shown in FIG. 1, such that the port 162A is in fluid communication with the port 68, the port 162B is in fluid communication with the port 80 and the port 162C is in fluid communication with the port 74. A second seal cage 136 is used as the center seal cage within the chamber 34, as shown in FIG. 1, such that the port 162A is in fluid communication with the port 56 and the port 162C is in fluid communication with the port 62, and the port 162B is unused. A third seal cage 136 is used as the top seal cage within the chamber 34, as shown in FIG. 1, such that the port 162A is in fluid communication with the port 46 and the port 162C is in fluid communication with the port 50, while the port 162B is unused. While the seal cage 136 as shown in FIGS. 6 and 7 includes three ports, the seal cage may include fewer or additional ports as desired.

Figures 3, 4, 5:
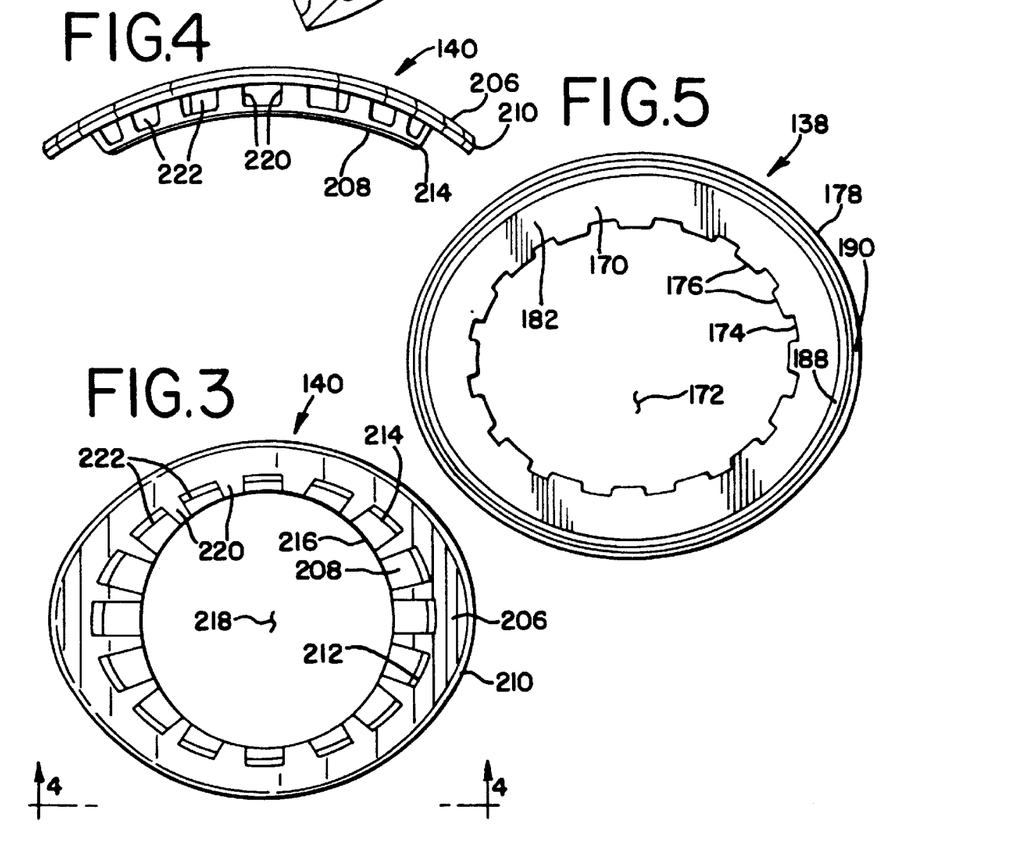
FIG. 3 is an external side elevational view of the seal retainer of the seal mechanism.
FIG. 4 is a bottom view of the seal mechanism.
FIG. 5 is an external side elevational view of the seal member of the seal mechanism.
Figure 11:
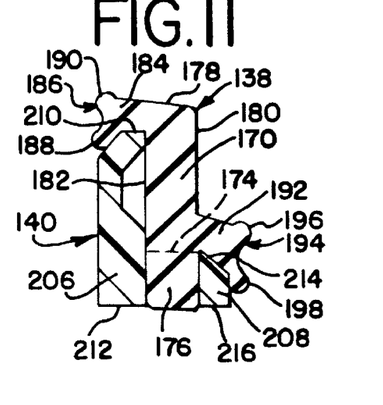
FIG. 11 is a cross-sectional view of the seal and retainer assembly taken along lines 11—11 of FIG. 10.

As shown in FIG. 5, the seal member 138 is generally elliptical. The seal member 138 includes a generally elliptical-shaped web 170 which forms a generally elliptical-shaped aperture 172 which extends through the seal member 138. The web 170 includes an internal rim 174 which includes a plurality of inwardly extending teeth 176 and an external rim 178. As best shown in FIG. 11, the web 170 includes an internal surface 180 and an external surface 182. The seal member 138 also includes an external flange 184 which extends outwardly from the external surface 182 of the web 170. The external flange 184 extends around the circumference of the web 170 along the external rim 178. The external flange 184 includes an external sealing face 186 which includes an internal seal rib 188 and an external seal rib 190. The external sealing face 186 and ribs 188 and 190 are adapted to sealingly engage the internal surface of the side wall 32 of the housing member 24. The seal member 138 also includes an internal flange 192 which extends inwardly from the internal surface 180 of the web 170 towards the axis 102. The internal flange 192 is located at and extends around the web 170 along the internal rim 174 such that the internal flange 192 is offset from the external flange 184. The internal flange 192 includes an internal sealing face 194. The internal sealing face 194 includes an internal seal rib 196 and an external seal rib 198. The internal sealing face 194 and ribs 196 and 198 are adapted to sealingly engage the surface 92 of the side wall 90 of the rotor 26. The seal member 138 is formed from a flexible and resilient plastic or rubber-like material.

As best shown in FIGS. 3 and 4, the seal retainer 140 includes an external generally elliptical rim 206 and internal generally elliptical rim 208. The external rim 206 includes an outer peripheral edge 210 and an inner peripheral edge 212. The internal rim 208 includes an outer peripheral edge 214 and an inner peripheral edge 216. The inner edge 216 forms an aperture 218 which extends through the seal retainer 140. A plurality of spaced apart ribs 220 connect the internal rim 208 to the external rim 206. A plurality of apertures 222 are formed respectively between adjacent ribs 220 and the rims 206 and 208. As best shown in FIG. 4, the seal retainer 140 and the rims 206 and 208 are curved to conform to an arc of a circle and to conform to the shape of the collar 142 and side wall 32 of the housing 24. The seal retainer 140 is formed from a plastic material.

Figure 10:
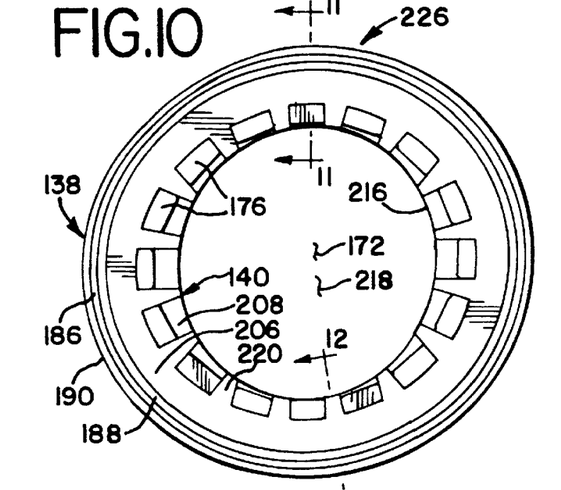
FIG. 10 is an external side elevational view of the seal and retainer assembly of the seal mechanism.

As shown in FIGS. 10–12, the seal member 138 is removably attached to the seal retainer 140 to form a seal and retainer assembly 226. The teeth 176 of the seal member 138 are inserted into the apertures 222 of the seal retainer 140. The external flange 184 of the seal member 138 extends around the outer edge 210 of the external rim 206 of the seal retainer 140 and the internal flange 192 of the seal member 138 extends around the outer edge 214 of the internal rim 208 of the seal retainer 140. The external sealing face 186 of the seal member 138 extends beyond the external surface of the external rim 206 and the internal sealing face 194 of the seal member 138 extends beyond the internal surface of the internal rim 208 of the seal retainer 140. The seal and retainer assembly 226, comprising the assembled seal member 138 and seal retainer 140, is removably located within the groove 164 of the port 162A of the seal cage 136, as shown in FIGS. 13 and 14. As best shown in FIG. 14, the internal flange 192 is located between the internal rim 208 of the seal retainer 140 and the rim 163 of the port 162A. The external seal rib 198 assists in removably retaining the seal and retainer assembly 226 in engagement with the collar 142. The external rim 178 of the seal member 138 engages the wall 166 of the groove 164. A seal and retainer assembly 226 is located in each of the ports 162A–C of the seal cages 136 of the control valve 20, except for those ports 162A–C which are not in fluid communication with a port in the housing member 24 as a seal and retainer assembly is not necessary for those ports. The respective ports 162A–C of the collar 142, aperture 172 of the seal member 138, and aperture 218 of the seal retainer 140 form a fluid passage through the seal mechanism 22 which is adapted to provide sealed fluid communication between the ports of the housing member 24 and the ports of the rotor 26.

In operation, a seal member 138 is engaged to a seal retainer 140 to form a seal and retainer assembly 226. One or more seal and retainer assemblies 226 are removably attached to the seal cage 136 within the groove 164 of a port 162A–C. One or more of the ports 162A–C in a seal cage 136 may be provided with a seal and retainer assembly 226. The seal mechanism 22 is inserted in the chamber 34 of the central body member 30 of the housing 24. The seal mechanism 22 is positioned by rotation about the axis 102 such that the external sealing faces 186 of each seal member 138 extend around a respective port in the housing member 24. Once the seal mechanism 22 is properly positioned, the spacer member 144 is inserted between the ends 150 and 152 of the collar 142 thereby spreading the ends 150 and 152 apart and forcing the external sealing faces 186 of the seal members 138 into sealing engagement with the internal surface of the side wall 32 of the housing member 24. The fluid passage extending through each seal and retainer assembly 226 is thereby sealed in fluid communication with a respective port in the housing member 24. Additional seal mechanisms 22 may then be inserted in a like manner within the chamber 34 of the housing 24, one on top of the other. The rotor 26 is then removably inserted within the chamber 34 and is concentrically located within the seal mechanisms 22 and the side wall 32 of the housing 24. The internal sealing faces 194 of the seal members 138 are in sealing engagement with the surface 92 of the side wall 90 of the rotor 26. The internal sealing faces 194 of the seal members 138 are adapted to provide a sealed fluid passage between the seal and retainer assembly 226 and the ports of the rotor 26. As the rotor 26 is rotated to different rotational positions, each seal and retainer assembly 226 provides a sealed fluid passage with the port in the rotor 26 that is aligned with the seal and retainer assembly 226.

When the rotor 26 is rotated to a rotational position wherein the port 110A of the rotor 26 is aligned with and in fluid communication with the port 46 of the housing member 24, the port 110B is aligned and in fluid communication with the port 56, such that a fluid passage extends from the port 46 through a first seal and retainer assembly 226, through the port 110A, fluid passage 118 and port 110B of the rotor 26, and through a second seal and retainer assembly 226 to the port 56. A fluid passage is also provided from the port 62 through a first seal and retainer assembly 226, through the port 110G, fluid passage 122 and port 110H of the rotor 26, and through a second seal and retainer assembly 226 to the port 74 of the housing 24.

When the rotor 26 is rotated to a rotational position wherein port 110A is aligned with and in fluid communication with the port 50 of the housing member 24, the port 110B is in fluid communication with the port 62, the port 110G is in fluid communication with the port 56 and the port 110H is in fluid communication with the port 68. A fluid passage is thereby provided from the port 50 through a first seal and retainer assembly 226, through the port 110A, fluid passage 118 and port 110B of the rotor 26, and through a second seal and retainer assembly 226 to the port 62 of the housing member 24. A second fluid passage is provided from the port 56, through a first seal and retainer assembly 226, through the port 110G, fluid passage 122 and port 110H of the rotor 26, and through a second seal and retainer assembly 226 to the port 68 of the valve housing member 24.

When the rotor 26 is rotated to a rotational position wherein the port 110E of the rotor 26 is aligned with and in fluid communication with the port 46 of the housing member 24, the port 110D is in fluid communication with the port 62, the port 110F is in fluid communication with the port 56 and the port 110C is in fluid communication with the port 80 of the housing member 24. In this position, the rotor 26 provides a first fluid passage from the port 46, through a first seal and retainer assembly 226, through the port 110E, fluid passage 126 and port 110F of the rotor 26, and through a second seal and retainer assembly 226 to the port 56 of the housing member 24. A second fluid passage is provided from the port 62, through a first seal and retainer assembly 226, through the port 110D, through the fluid passage 130 and port 110C of the rotor 26, and through a second seal and retainer assembly 226 to the port 80 of the housing member 24.

When the rotor is rotated to a position wherein the port 110E is aligned with the port 50 of the housing 24, the rotor 26 prevents fluid flow between the ports of the housing 24.

The rotor 26 as described herein may be removed from the housing 24 and replaced with a different rotor having a different configuration of ports and fluid passages such that the new rotor provides different fluid passages through the valve 20. The locations of the ports in the valve housing 24 may also be varied as desired. Thus, the fluid flow paths and cycles of the control valve 20 may be changed as required to provide desired fluid flow paths and cycles.

Various features of the invention have been particularly shown and described in connection with the illustrated embodiment of the invention, however, it must be understood that these particular arrangements merely illustrate, and that the invention is to be given its fullest interpretation.

What is claimed is:

1. A seal mechanism for use in a valve having a housing with one or more ports located in an internal surface and a rotor having an external surface and one or more ports located in the external surface, the rotor being selectively rotatable within the housing, said seal mechanism including:
   a seal member having a web including an internal rim and an external rim, a first aperture located in said web, a plurality of teeth located on said internal rim of said web, a first flange extending from adjacent said external rim of said web in a first direction and a second flange extending from adjacent said internal rim of said web in a second direction generally opposite to said first direction, said first and second flanges extending along said web around said aperture, said first flange having a first sealing face adapted to sealingly engage the housing, said second flange having a second sealing face adapted to sealingly engage the external surface of the rotor, said seal member adapted to provide a sealed fluid passage through said first aperture between a port of the rotor and a port of the housing.

2. The seal mechanism of claim 1 wherein said first flange of said seal member is concentrically offset from said second flange.

3. The seal mechanism of claim 2 wherein said web includes a first surface and a second surface, said first flange extending from said first surface of said web and said second flange extending from said second surface of said web.

4. The seal mechanism of claim 1 wherein said seal member is integrally formed.

5. The seal mechanism of claim 1 including a cage having a generally cylindrical collar, said collar adapted to be located between the rotor and the housing of the valve, said collar including a port adapted to align with a port of the rotor and a port of the housing, said collar including a groove which extends around the circumference of said port in said collar, said groove adapted to receive said seal member.

6. The seal mechanism of claim 5 wherein said port of said collar includes a rim and said groove includes a wall which extends around said port of said collar, said first flange of said seal member adapted to extend along and adjacent to said wall of said groove and said second flange of said seal member adapted to extend along and adjacent to said rim of said port of said collar such that said first sealing face of said first flange is located outwardly with respect to said collar and said second sealing face of said second flange is located inwardly with respect to said collar.

7. The seal mechanism of claim 6 wherein said second surface of said web of said seal member is adapted to engage and extend along said groove of said collar and around said port in said collar.

8. A valve for controlling the flow of fluid through a water conditioning system, said valve including:
   a housing having a generally cylindrical chamber formed about a longitudinal axis, said housing including a plurality of ports spaced apart from one another along said longitudinal axis;
   a generally cylindrical rotor located within said chamber of said housing adapted to be selectively rotatable about said longitudinal axis, said rotor including an external surface including a plurality of ports spaced apart from one another along said longitudinal axis, one or more of said ports of said rotor being adapted to respectively align with one or more of said ports of said housing when said rotor is selectively rotated to one of a plurality of rotational positions; and
   a plurality of seal mechanisms, each said seal mechanism being located between said external surface of said rotor and said housing, said seal mechanisms being respectively located along said longitudinal axis with respect to one another, each said seal mechanism including
      a cage having a generally cylindrical collar which extends substantially around the circumference of said rotor, said collar including a port,
      a seal member associated with said collar, said seal member including an aperture aligned with said port of said collar, said seal member including a first flange and a second flange, said first flange having a first sealing face adapted to sealingly engage said housing, said second flange including a second sealing face adapted to sealingly engage said external surface of said rotor, said seal member adapted to provide a sealed fluid passage through said aperture of said seal member between a port of said rotor and a port of said housing.

9. The valve of claim 8 wherein said cages of said seal mechanisms are located adjacent to one another along said longitudinal axis.

10. The valve of claim 8 wherein each said collar includes a first end and a second end, each said cage including a respective spacer member located between said first and second ends of said collar.

11. The valve of claim 10 wherein each said spacer member is generally wedge-shaped such that as said spacer member is inserted between said first and second ends of said collar, said spacer member spreads said first end of said collar apart from said second end such that said collar presses said first sealing face of said first flange of said seal member into sealing engagement with said housing.

12. The valve of claim 8 wherein said seal mechanisms remain stationary with respect to said housing as said rotor is selectively rotated.

13. A seal mechanism for use in a valve having a housing with one or more ports located in an internal surface and a rotor having an external surface and one or more ports located in the external surface, the rotor being selectively rotatable within the housing, said seal mechanism including:
   a seal member having a web, a first aperture located in said web, a first flange extending from said web in a first direction and a second flange extending from said web in a second direction generally opposite to said first direction, said first and second flanges extending along said web around said aperture, said first flange having a first sealing face adapted to sealingly engage the housing, said second flange having a second sealing face adapted to sealingly engage the external surface of the rotor, each said sealing face respectively including an external seal rib an internal seal rib located generally concentrically within said external seal rib, said seal member adapted to provide a sealed fluid passage through said first aperture between a port of the rotor and a port of the housing.

14. A seal mechanism for use in a valve having a housing with one or more ports located in an internal surface and a rotor having an external surface and one or more ports located in the external surface, the rotor being selectively rotatable within the housing, said seal mechanism including:

a seal member having a web including an internal rim, a first aperture located in said web, a first flange extending from said web in a first direction and a second flange extending from said web in a second direction generally opposite to said first direction, said first and second flanges extending along said web around said aperture, said first flange having a first sealing face adapted to sealingly engage the housing, said second flange having a second sealing face adapted to sealingly engage the external surface of the rotor, said seal member adapted to provide a sealed fluid passage through said first aperture between a port of the rotor and a port of the housing; and a retainer member adapted to be associated with said seal member, said retainer member including a first rim having an outer peripheral edge and a second rim having an outer peripheral edge and an inner peripheral edge, said inner peripheral edge of said second rim forming a second aperture adapted to be aligned with said first aperture in said seal member, said first flange of said seal member adapted to extend around said outer peripheral edge of said first rim and said second flange of said seal member adapted to extend around said outer peripheral edge of said second rim.

15. The seal mechanism of claim 14 wherein said first surface of said web of said seal member is adapted to engage and extend along said first rim of said retainer member.

16. The seal mechanism of claim 15 wherein said second rim of said retainer member is spaced apart from said first rim, said retainer member including a plurality of third apertures located between said first rim and said second rim.

17. The seal mechanism of claim 16 wherein said retainer member includes a plurality of spaced apart ribs extending between said first rim and said second rim, said third apertures of said retainer member being located respectively between adjacent ribs.

18. The seal mechanism of claim 16 wherein said seal member includes a plurality of teeth located on said internal rim of said web, said teeth adapted to be respectively inserted into said third apertures in said retainer member.

19. A seal mechanism for use in a valve having a housing with one or more ports located in an internal surface and a rotor having an external surface and one or more ports located in the external surface, the rotor being selectively rotatable within the housing, said seal mechanism including:

a seal member having a web, a first aperture located in said web, a first flange extending from said web in a first direction and a second flange extending from said web in a second direction generally opposite to said first direction, said first and second flanges extending along said web around said aperture, said first flange having a first sealing face adapted to sealingly engage the housing, said second flange having a second sealing face adapted to sealingly engage the external surface of the rotor, said seal member adapted to provide a sealed fluid passage through said first aperture between a port of the rotor and a port of the housing; and a cage having a generally cylindrical collar including a first end and a second end and a spacer member located between said first end and said second end of said collar, said collar adapted to be located between the rotor and the housing of the valve, said collar including a port adapted to align with a port of the rotor and a port of the housing, said collar including a groove which extends around the circumference of said port in said collar, said groove adapted to receive said seal member.

20. The seal mechanism of claim 19 wherein said spacer member is generally wedge-shaped such that as said spacer member is inserted between said first and second ends of said collar, said spacer member spreads said first end apart from said second end.

* * * * *